United States Patent [19]

Yoshii et al.

[11] Patent Number: 4,786,802
[45] Date of Patent: Nov. 22, 1988

[54] APPARATUS FOR MEASURING PHOTOELASTICITY

[75] Inventors: Masaki Yoshii, Yokohama; Shigeo Tohyama, Katsuta; Aizo Kaneda, Yokohama, all of Japan

[73] Assignee: Hitachi, Ltd., Tokyo, Japan

[21] Appl. No.: 711

[22] Filed: Jan. 6, 1987

[51] Int. Cl.$^4$ .............................................. G02F 1/01
[52] U.S. Cl. ........................................ 250/225; 356/366
[58] Field of Search .............. 250/225; 356/364, 365, 356/366, 367, 368, 370

[56] References Cited

U.S. PATENT DOCUMENTS

| 2,731,875 | 1/1956 | Gould | 356/367 |
| 3,741,660 | 6/1973 | Abu-Shumays et al. | 250/225 |
| 4,171,908 | 10/1979 | Robert et al. | 250/225 |
| 4,309,110 | 1/1982 | Tumerman | 356/366 |

Primary Examiner—David C. Nelms
Attorney, Agent, or Firm—Antonelli, Terry & Wands

[57] ABSTRACT

An apparatus for measuring photoelasticity permitting to control mechanical stress applied to an elastic body, by visualizing phase differences of polarized light transmitted by the elastic body is disclosed. In such a prior art apparatus a quarter wavelength plate was used in order to obtain circularly polarized light. However, the precision of the circularly polarized light is worsened, when it works in a wide wavelength region. To the contrary, in an apparatus according to this invention, circularly polarized light is obtained by means of Fresnel's rhombic body. As the result good circularly polarized light can be obtained for a wide wavelength region from the visible region to the near infrared region and control of products including thin films and semiconductor substrates can be effected by visualizing mechanical stress therein.

9 Claims, 4 Drawing Sheets

APPARATUS FOR MEASURING PHOTOELASTICITY

BACKGROUND OF THE INVENTION

This invention relates to an apparatus for measuring photoelasticity and in particular to an optical system employing circular polarization for light of a wide wavelength region including the infrared region.

An apparatus disclosed in a Japanese reference "Oryoku Sokutei Ho (Stress Measuring Methods)" pp. 473–692, particularly pp. 492–503, published by Asakura Publishing Co., November 1964 has been known as an apparatus for measuring photoelasticity. However, the objects to be measured by means thereof are restricted to glass and plastic, which are transparent for the visible light region and white light (wavelength 400–760 nm) emitted by a tungsten lamp, D line (wavelength 589 nm) emitted by a natrium lamp, and light (wavelength 400–580 nm) emitted by a mercury lamp, that have been used as a light source therefor. In order to obtain the circular polarization necessary for the measurement of the photoelasticity, a quarter wavelength plate is used. Among the light sources described above, for the white light and the ultraviolet light, quarter wavelength plates for their center wavelength 580 nm and 490 nm, respectively, are used. Further, in the case where the light emitted by the light source is monochromatic as D line emitted by a natrium lamp, a phase shifter made of mica and corresponding to a wavelength of 147.25 nm is used as a quarter wavelength plate.

For this reason, when photoelasticity is measured by using a light source emitting light of wide wavelength region, it is difficult to obtain correctly circularly polarized light and measurement precision is not taken sufficiently into consideration. Further, in the case where a plurality of kinds of monochromatic light sources are used, they give rise to a problem similar to that of the light source stated above. As the result, an operation to interchange quarter wavelength plate in the course of a measurement is necessary, which complicates the measurement.

A stress measuring method, using the infrared photoelastic effect is disclosed in, for example, JP-A-No. 57-191504.

On the other hand, a catalog of an apparatus for measuring photoelasticity in the infrared region (Photolastic Inc. Model 501, Infrared polariscope) can be cited as a recent publication. However, this apparatus works only for a wavelength of 1.13 μm and doesn't meet the needs to measure photoelasticity by using a light source emitting light of wide wavelength region.

SUMMARY OF THE INVENTION

An object of this invention is to provide an apparatus for measuring photoelasticity permitting a continuous a measurement without interchange any element of the optical system, while using light of wide wavelength region.

Another object of this invention is to provide an apparatus for measuring photoelasticity having a simple construction of the optical system and providing correctly circularly polarized light.

This invention is characterized in that an apparatus for measuring photoelasticity using a light source emitting light of wide wavelength region or a plurality of kinds of monochromatic light sources and having a simple construction, which can be operated easily, by utilizing a Fresnel rhombic body (FIG. 6) acting as a quarter wavelength plate for light of wide wavelength region.

The Fresnel rhombic body is originated in a rhombohedron made of glass used by Fresnel, who has discovered the circular polarization. At present principally a quarter wavelength plate is used in order to obtain circularly polarized light from linearly polarized and the problem pointed out in the description of the prior art of this invention remains.

The Fresnel rhombic body (hereinbelow referred to as Fresnel rhomb) produces a phase shift corresponding to quarter wavelength, i.e. phase shift of 90 deg. by two total reflections, as indicated in FIG. 6. When linearly polarized light 3 enters a Fresnel rhomb 1, it is transformed into circularly polarized light 4 and emerges therefrom. Denoting the incident angle 2 in the Fresnel rhomb 1 by $\theta$, the value of the incident angle $\theta$ depends on the wavelength of the used light and can be given by;

$$\tan 22.5° = \frac{\cos\theta \sqrt{\sin^2\theta - (1/n)^2}}{\sin^2\theta}$$

where n represents the refractive index of the material, of which the Fresnel rhomb is made. Since the refractive index depends on the wavelength of the light, the incident angle depends also on the wavelength. When the incident angle $\theta$ is calculated, supposing that the material, of which the Fresnel rhomb is made, is glass BK7 and that the wavelength of the used light is 589 nm (D line), $\theta = 55°14'2''$ is obtained. When the phase shift in function of the wavelength is calculated for this incident angle of 55°14'2'', the relationship between the wavelength and the phase shift, as indicated in FIG. 7, is obtained and it can be understood that it acts as a quarter wavelength plate for a wavelength region between 500 and 800 nm with a precision in phase difference of 90±0.5 deg.

This invention is characterized in that the characteristics of the Fresnel rhomb that variations in the refractive index due to variations in the wavelength are relatively small are applied to a device in practice.

DESCRIPTION OF THE PREFERRED EMBODIMENTS

Figure 1:
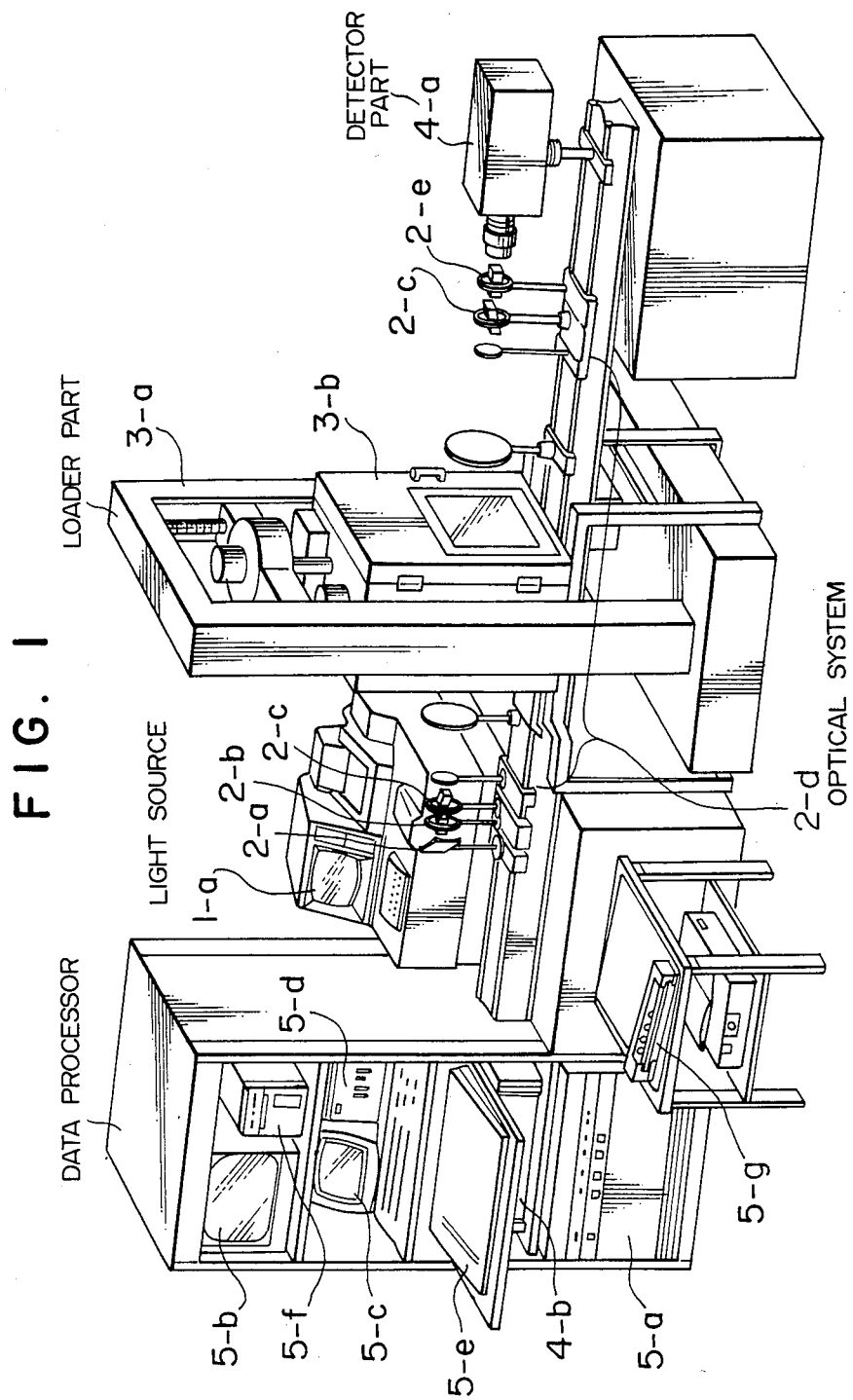
FIG. 1 is a perspective view illustrating an embodiment of apparatuses for measuring photoelasticity according to this invention.

FIG. 1 shows an apparatus for measuring photoelasticity, which is an embodiment of this invention, in which the light source part consists of a spectroscopic light source, which emits light for different wavelengths between 400 and 2600 nm, while analyzing spectroscopically light coming from a halogen lamp. The light of the relevant wavelength region corresponds to the regions from visible light to near infrared radiation. The optical system is composed of a troidal mirror 2-a, a polarizer 2-b consisting of a Glan-Taylor prism having an extinction ratio of $10^{-5}$ a Fresnel rhomb 2-c, lenses 2-d and an analyzer 2-e consisting of a Glan-Taylor prism. The loading part is composed of a load element 3-a, which can effect tension, compression, bending and shearing with a maximum load of 500 kg, and a thermal chamber 3-b, which can set the temperature between $-130°$ and $250°$ C. with a precision of $\pm 1°$ C. The detector part is composed of a visible-infrared camera 4-a, which is sensible to light in the wavelength region between 400 and 2200 nm and a camera controller 4-b controlling the camera. The data processor calculates the principal stress difference $\sigma_1 - \sigma_2$, the principal stress values $\sigma_1$, $\sigma_2$, the principal stress direction, and the shearing stress $\tau_{xy}$ and is composed of a CPU 5-a, a television monitor 5-b, a console 5-c, a floppy disc drive 5-d, a digitizer 5-e, a video printer 5-f, and a plotter 5-g.

Hereinbelow this invention will be explained, by referring to FIG. 2 and the following illustrating the construction of different embodiments, where various items are indicated by new reference numerals.

Figure 2:
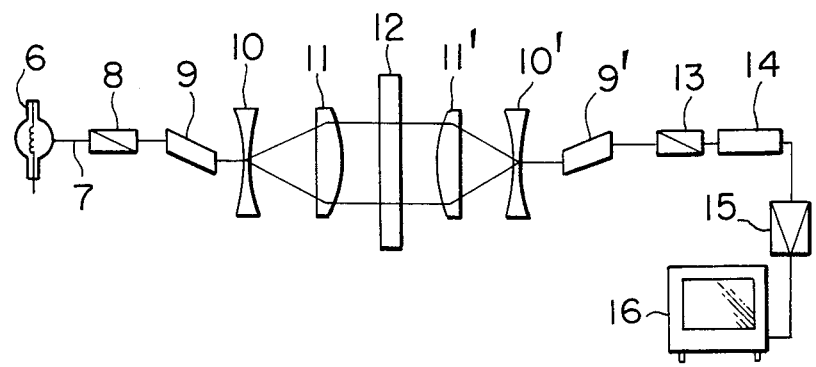
FIG. 2 is a scheme indicating the construction of the above embodiment.
Figure 3:
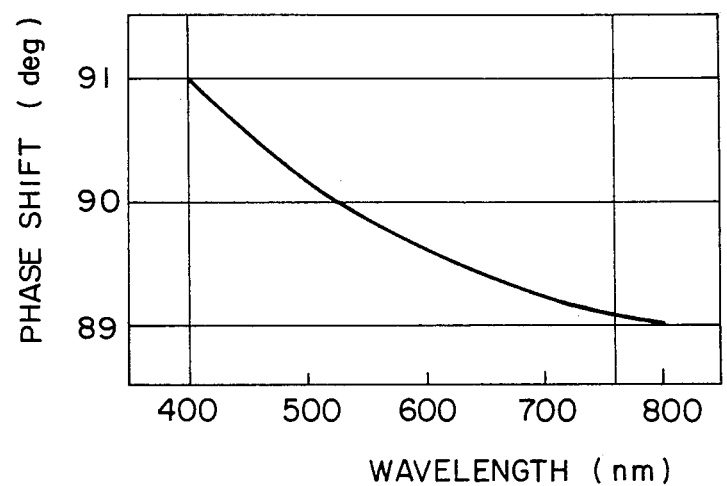
FIG. 3 is a graph representing the phase shift produced by the Fresnel rhomb used in the above embodiment.

In FIG. 2, a tungsten lamp is used as the light source 6, which emits white light (visible light $\lambda = 400-760$ nm). Light 7 emitted by the light source 6 is transformed into linearly polarized light, passing through a polarizer 8 and further into circularly polarized light by a quarter wavelength plate 9 consisting of a Fresnel rhomb. It is further transformed into a parallel light beam having a large diameter through a concave lens 10 and a convex lens 11 and projected to a specimen to be measured 12. Light transmitted through the specimen to be measured 12 is collected by a convex lens 11' and a concave lens 10' and enters a television camera 14 through a quarter wavelength plate 9' consisting of a Fresnel rhomb and an analyzer 13. The signal (clear and dark) representing photoelastic fringes produced by the photoelastic effect on the specimen to be measured 12 is imaged on a television monitor through an amplifier 15 by the television camera 14. In this way a photoelastic measurement on the specimen to be measured is effected. In this case, the incident angle $\theta$ on the quarter wavelength plate consisting of a Fresnel rhomb is so set that the phase shift is $90 \pm 1$ deg. for the visible light region. When the incident angle $\theta$ is calculated, supposing that the material, of which the Fresnel rhomb is made, is glass BK7 (trade name of an article commercialized by Schott Co. in West Germany) and that the refractive index $n = 1.521$ for the wavelength $\lambda = 537$ nm, $\theta = 55°31'40''$ is obtained. The quarter wavelength plate consisting Fresnel rhomb having the incident angle described above of $55°31'40''$ gives phase shifts for different wavelengths, as indicated in FIG. 3, and acts as a quarter wavelength plate producing a phase shift of $90 \pm 1$ deg. for light of the wavelengths in the whole visible light region.

Figure 4:
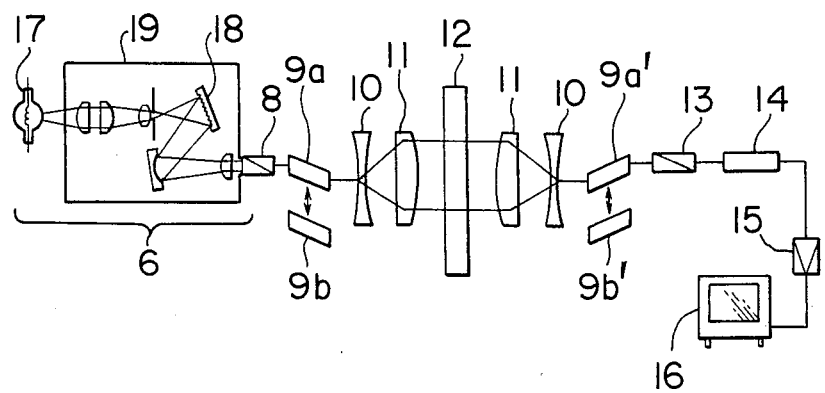
FIG. 4 is a scheme illustrating the construction of another embodiment of apparatuses for measuring photoelasticity according to this invention.
Figure 5:
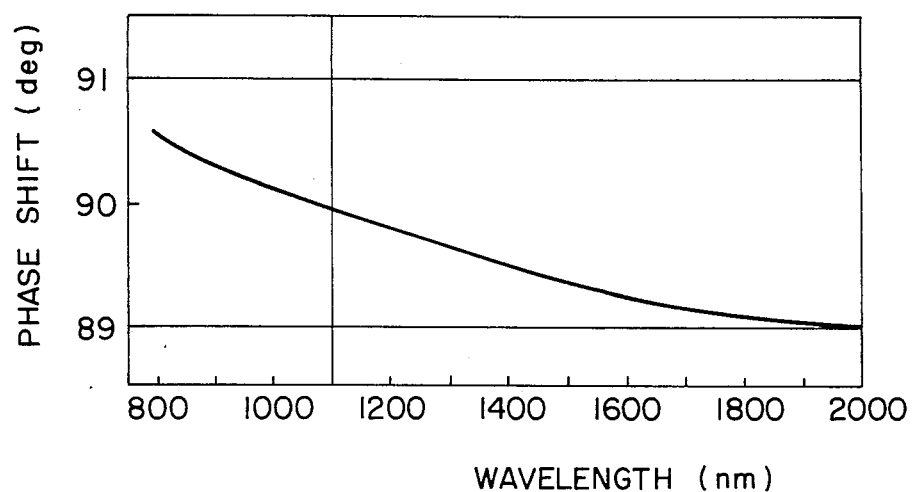
FIG. 5 is a graph representing the phase shift produced by the Fresnel rhomb used in the embodiment in FIG. 4.
Figure 6:
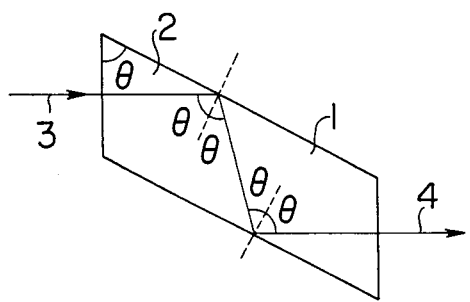
FIG. 6 is a scheme illustrating a Fresnel's rhombic body, which can be used for this invention.
Figure 7:
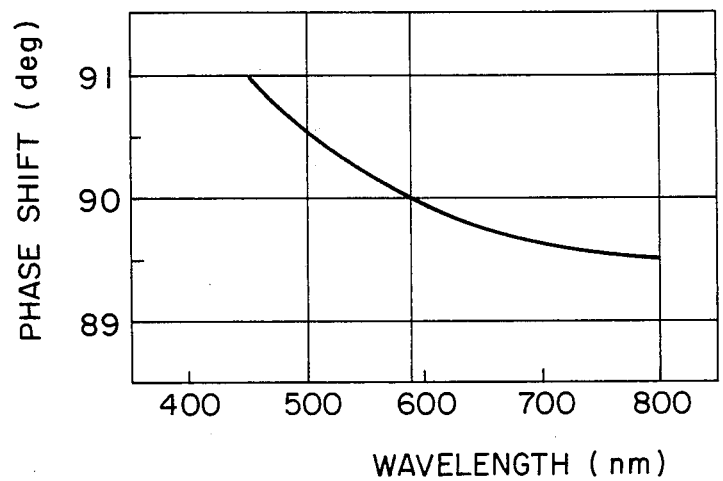
FIG. 7 is a graph representing the phase shift produced by the Fresnel rhomb in FIG. 6 with respect to the light incident thereto.

Now, another embodiment having the construction indicated in FIG. 4 will be explained. In FIG. 4, the light source 6 is composed of a halogen lamp 17 and a spectroscope separating light having an arbitrary wavelength by means of a diffraction grating 18 from the light emitted by the halogen lamp 17. In this way the apparatus for measuring photoelasticity according to this embodiment permits to effect photoelastic measurements by using arbitrary light in a wavelength region between 400 and 2000 nm (from visible light to near infrared light). In the construction illustrated in FIG. 4, the downstream from the polarizer 8 is basically identical to that described in the preceding embodiment, except that 2 kinds of Fresnel rhomb quarter wavelength plates are used, one for $\lambda = 400-760$ nm (visible light) and the other for $\lambda = 760-2000$ nm (near infrared radiation) and that the television camera 14' is sensitive to light of $\lambda = 400-2200$ nm. The Fresnel rhomb quarter wavelength plates 9a and 9a' for $\lambda = 400-760$ nm are made of glass BK7, similarly to that described in the preceding embodiment and the incident angle $\theta$ is $55°31'40''$. On the other hand, for the Fresnel rhomb quarter wavelength plates 9b and 9b' for $\lambda = 760-2000$ nm those, for which the incident angle $\theta$ giving a phase difference of $90°$ is $54°18'14''$ for a refractive index $n = 1.507$ for a wavelength $\lambda = 1100$ nm, when they are made of glass BK7, are used. FIG. 5 indicates a graph representing phase shifts vs. wavelength for the Fresnel rhomb quarter wavelength plates 9b, 9b' stated above. From FIG. 5 it can be understood that a phase shift of $90 \pm 1$ deg. can be surely obtained for the wavelength region between 700 and 2000 nm. Consequently it is possible to effect photoelasticity measurements for a wide wave-length region between 400 and 2000 nm by mounting in the apparatus and using one of the two kinds of Fresnel quarter wavelength plates 9a, 9a' and 9b, 9b', as described in the preceding embodiment, depending on the wavelength of the light used.

A plurality of laser lights or a die laser can be used as the light source in the embodiments described above. Further, it is possible to ameliorate the precision on the phase shift by using more than 3 kinds of Fresnel rhombs. In addition, although Glan-Taylor prisms made of calcite having a high extinction ratio and absorbing no light for a wavelength region between 310 and 2300 nm were used for the polarizer 8 and the analyzer 13 in the above embodiments, Glan-Thomson prisms can be used instead thereof.

Furthermore it is required that the Fresnel rhombs are made of a material, whose refractive index n is not smaller than about 1.496, preferably, 1.49661. This is a result obtained from the calculation formula described previously under the condition to obtain a precise phase shift of $90°$. Therefore the Fresnel rhombs indicated in Table 1 can be used arbitrarily, depending on the required precision on the phase shift. In the table the materials are identified by trade names of Schott Co. in West Germany, which are well known by those skilled in the art.

TABLE 1

| refractive index | | Material | | | |
|---|---|---|---|---|---|
| | | BK7 | quartz | SF6 | BaSF7 |
| $n_D$ | | 1.517 | 1.458 | 1.805 | 1.702 |
| visible region | incident angle $\theta$ | 50°31'40'' | 51°25'06'' | 61°59'11'' | 60°44'06'' |
| 400-760 nm | phase shift | 89.1~ 90.0 | 84.0~ 86.0 | 89.4~ 91.6 | 89.5~ 91.1 |

TABLE 1-continued

| refractive index $n_D$ | | Material | | | |
|---|---|---|---|---|---|
| | | BK7 | quartz | SF6 | BaSF7 |
| | | 1.517 | 1.458 | 1.805 | 1.702 |
| near infrared region 760-2000 nm | incident angle θ [deg] | 54°18′14″ | 51°25′06″ | 61°36′54″ | 60°21′28″ |
| | phase shift [deg] | 89.0~90.5 | 81.0~84.0 | 89.4~90.5 | 89.4~90.5 |

Since, in the apparatus for measuring photoelasticity according to this invention, permitting to effect measurement of stress in specimens, a Fresnel rhomb quarter wavelength plate is used as a quarter wavelength plate constituting a part of the apparatus and it acts as a quarter wavelength plate for a wide wavelength region, it is possible to obtain purely circularly polarized light in photoelasticity measurements using light including components of wide wavelength region such as white light as the light source and thus to ameliorate measurement precision. Further, in the case where photoelasticity measurements are effected by using a plurality of monochromatic lights, it is not needed to prepare a number of quarter wavelength plates corresponding to various wavelengths and in this way it is possible to simplify the measurement apparatus and the measurement operation.

In addition an effect can be obtained to control products including not only Si monocrystal substrates but also polycrystalline Si semiconductor substrates, amorphous Si substrates, transparent objects, molded articles of opaque resins such as ABS resins or HIPS (High Impact Polystyrene) resins, and furthermore all sorts of thin films, whose thickness is about 1.0 μm, by visualizing stress therein.

We claim:

1. Apparatus for measuring photoelasticity comprising:
    a tungsten lamp:
    means including a polarizer for linearly polarizing light emitted by said lamp to produce linearly polarized light;
    means including a first Fresnel rhomb for transforming said linearly polarized light into a circularly polarized light beam;
    a first concave lens means for enlarging the diameter of said circularly polarized light beam;
    a first convex lens means for collimating the enlarged circularly polarized light beam to irradiate a specimen with a collimated circularly polarized light beam;
    a second convex lens means for focusing the collimated circularly polarized light beam transmitted through said specimen;
    a second concave lens means for transmitting the focused circularly polarized light beam to means incuding a second Fresnel rhomb;
    said second Fresnel rhomb being effective to transform said circularly polarized light beam received from said second concave lens into linearly polarized light;
    an analyzer means for detecting the phase difference of said light beam transmitted through said specimen; and
    a camera means for visualizing the light coming from said analyzer.

2. Apparatus for measuring photoelasticity according to claim 1, wherein said first and second Fresnel rhombs are made of a transparent material having a refractive index not smaller than about 1.496.

3. Apparatus for measuring photoelasticity according to claim 2, wherein said first and second Fresnel rhombs are made of BK7, quarz, SF6 or BaSF7 and are so designed that the angles of incidence thereon are 55°31′40″, 51°25′06″, 61°59′11″ or 60°44′06″.

4. Apparatus for measuring photoelasticity according to claim 1, wherein said tungsten lamp emits light over a wide wavelength range from about 400 nm to about 760 nm.

5. Apparatus for measuring photoelasticity comprising:
    a halogen lamp for emitting light over a predetermined wavelength region;
    means incuding a spectroscope for spectroscopically separating the light emitted by said lamp;
    means including a polarizer for linearly polarizing light from said spectroscope to produce linearly polarized light;
    means including a first pair of Fresnel rhombs provided for alternative use with one of said rhombs being used with a shorter wavelength portion and the other of said rhombs being used with a longer wavelength portion of said predetermined wavelength region, each of the Fresnel rhombs being effective to transform said linearly polarized light into a circularly polarized light beam;
    a first concave lens means for enlarging the diameter of said circularly polarized light beam;
    a first convex lens means for collimating the enlarged circularly polarized light beam to irradiate a specimen with a collimated circularly polarized light beam;
    a second convex lens means for focusing the collimated circularly polarized light beam transmitted through said specimen;
    a second concave lens means for transmitting focused circularly polarized light beam to means including a second pair of Fresnel rhombs;
    said second pair of Fresnel rhombs being provided for alternative use corresponding to the use of the individual ones of said first pair of Fresnel rhombs, each of the Fresnel rhombs in said second pair being effective to transform said circularly polarized light beam received from said second concave lens into linearly polarized light;
    an analyzer means for detecting the phase difference of said light beam transmitted through said specimen; and
    a camera means for visualizing the light coming from said analyzer.

6. Apparatus for measuring photoelasticity according to claim 5, wherein the Fresnel rhombs in each of said first and second pairs are made of a transparent material having a refractive index not smaller than about 1.496.

7. Apparatus for measuring photoelasticity according to claim 6, wherein the Fresnel rhombs in each of said first and second pairs are made of BK7, quartz, SF6 or BaSF7 and are so designed that the angles of incidence thereon, are a pair of 55°31′40″ and 54°18′14″, a pair of 51°25′06″ and 51°25′06″, a pair of 61°59′11″ and 61°36′54″ or a pair of 60°44′06″ and 60°21′28″.

8. Apparatus for measuring photoelasticity according to claim 5, wherein said predetermined wavelength region includes the range of from about 400 nm and to about 2000 nm.

9. Apparatus for measuring photoelasticity according to claim 8, wherein one of the Fresnel rhombs in said first pair and one of the Fresnel rhombs in said second pair corresponding thereto are effective for use with wavelengths ranging from about 400 nm to about 760 nm while the other Fresnel rhomb in said first pair and the other Fresnel rhomb in said second pair corresponding thereto are effective for use with wavelengths ranging from about 760 nm to about 2000 nm.

* * * * *